US012600838B2

(12) United States Patent
Numao et al.

(10) Patent No.: US 12,600,838 B2
(45) Date of Patent: Apr. 14, 2026

(54) SPHERICAL ALUMINA PARTICLE MIXTURE, METHOD FOR PRODUCING SAME, AND RESIN COMPOSITE COMPOSITION AND RESIN COMPOSITE BODY EACH CONTAINING SAID SPHERICAL ALUMINA PARTICLE MIXTURE

(71) Applicant: NIPPON STEEL Chemical & Material Co., Ltd., Tokyo (JP)

(72) Inventors: Ryutaro Numao, Tokyo (JP); Yasuhiro Aoyama, Tokyo (JP); Masanori Ae, Tokyo (JP); Mutsuhito Tanaka, Tokyo (JP); Katsumasa Yagi, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 0 days.

(21) Appl. No.: 18/285,206

(22) PCT Filed: Mar. 30, 2022

(86) PCT No.: PCT/JP2022/016162
§ 371 (c)(1),
(2) Date: Sep. 29, 2023

(87) PCT Pub. No.: WO2022/210928
PCT Pub. Date: Oct. 6, 2022

(65) Prior Publication Data
US 2024/0182686 A1      Jun. 6, 2024

(30) Foreign Application Priority Data

Mar. 31, 2021    (JP) ................................. 2021-060414

(51) Int. Cl.
C08K 7/18        (2006.01)
C01F 7/02        (2022.01)
C09C 1/40        (2006.01)

(52) U.S. Cl.
CPC .................. C08K 7/18 (2013.01); C01F 7/02 (2013.01); C09C 1/407 (2013.01); C08K 2201/005 (2013.01); C08K 2201/006 (2013.01)

(58) Field of Classification Search
CPC .................................. C01F 7/02; C09C 1/407
See application file for complete search history.

(56) References Cited

U.S. PATENT DOCUMENTS 6,096,414  A  *  8/2000  Young ....................... C09K 5/14
                                                    428/447
2011/0256051  A1 * 10/2011  Sawano ................... C01F 7/441
                                                    423/629

(Continued)

FOREIGN PATENT DOCUMENTS

CN          112007625 A  * 12/2020  ........... C07D 301/10
JP          10-237311 A      9/1998

(Continued)

OTHER PUBLICATIONS

Machine translation of WO-2015133191-A1, publication date Sep. 11, 2015.*

Primary Examiner — Jun Li
(74) Attorney, Agent, or Firm — Birch, Stewart, Kolasch & Birch, LLP

(57)        ABSTRACT

A spherical alumina particle mixture able to improve a thermal conductivity and keep down a viscosity of a resin composition formed when kneading the mixture with a resin and a method for producing the same, that is, a spherical alumina particle mixture wherein in a particle size distribution measured by a wet sieving test method, 180 μm or more particles account for 0.04 wt % or less, an an α-alumina (Continued)

CHANGE OF VARIOUS PHYSICAL PROPERTIES DUE TO BLENDING RATIO OF COARSE POWDER crystal content rate is 45% or more, a specific surface area is 0.3 to 1.0 m²/g, and a roundness is 0.85 or more, and a method for producing the same.

6 Claims, 3 Drawing Sheets

(56)               References Cited

U.S. PATENT DOCUMENTS

| | | | |
|---|---|---|---|
| 2017/0210886 A1 | 7/2017 | Ikeda et al. | |
| 2019/0308883 A1 * | 10/2019 | Yuan | C01F 7/30 |
| 2023/0134132 A1 * | 5/2023 | Komaki | C08K 3/22 |
| | | | 423/625 |
| 2023/0150830 A1 * | 5/2023 | Komaki | C08K 9/06 |
| | | | 423/625 |
| 2023/0193103 A1 | 6/2023 | Komaki et al. | |
| 2023/0331572 A1 * | 10/2023 | Aikyo | C01F 7/02 |

FOREIGN PATENT DOCUMENTS

| | | | | | |
|---|---|---|---|---|---|
| JP | 2001-226117 A | | 8/2001 | | |
| JP | 2007-153989 A | | 6/2007 | | |
| JP | 2012-20900 A | | 2/2012 | | |
| JP | 5085050 B2 | | 11/2012 | | |
| JP | 5345340 B2 | | 11/2013 | | |
| KR | 20110115535 A | * | 10/2011 | | C01F 7/441 |
| WO | WO-2015133191 A1 | * | 9/2015 | | C01F 7/442 |
| WO | WO 2016/017637 A1 | | 2/2016 | | |
| WO | WO 2021/200491 A1 | | 10/2021 | | |
| WO | WO-2021200486 A1 | * | 10/2021 | | C01F 7/02 |
| WO | WO-2021200490 A1 | * | 10/2021 | | C01F 7/02 |
| WO | WO-2022071140 A1 | * | 4/2022 | | C01F 7/02 |

* cited by examiner

CHANGE OF VARIOUS PHYSICAL PROPERTIES DUE TO
BLENDING RATIO OF FINE POWDER

CHANGE OF VARIOUS PHYSICAL PROPERTIES DUE TO
BLENDING RATIO OF ULTRAFINE POWDER

SPHERICAL ALUMINA PARTICLE MIXTURE, METHOD FOR PRODUCING SAME, AND RESIN COMPOSITE COMPOSITION AND RESIN COMPOSITE BODY EACH CONTAINING SAID SPHERICAL ALUMINA PARTICLE MIXTURE

FIELD

The present invention relates to a spherical alumina particle mixture, in particular a spherical alumina particle mixture provided with high thermal conductivity and fluidity, a method for producing the same, and a resin composite composition and resin composite body each containing that spherical alumina particle mixture.

BACKGROUND

In recent years, due to the increasingly higher functions and increasingly higher speeds of mobile phones and other electronic equipment, the amount of heat generated from the electronic devices inside of the electronic equipment has been increasing. For normal operation of the electronic equipment, making the generated heat be efficiently dissipated to the outside has been becoming an important issue. For dissipating the heat, frequent use is made of what are called "thermal pads" and "thermally conductive adhesives". These are attached or coated between the heat generating bodies and heat sinks which are then press-fit to thereby eliminate the gaps between the heat generating bodies and heat sinks and enable efficient dissipation of heat. Further, the semiconductors themselves inside of the electronic devices also remarkably generate heat due to similar increasingly higher functions and increasingly higher speeds. The sealants protecting the semiconductors are also desirably being made heat dissipating.

In general, thermal pads, thermally conductive adhesives, and semiconductor sealants are comprised of thermally conductive inorganic fillers and resins. For the thermally conductive inorganic fillers, inexpensive aluminum hydroxide or aluminum oxide (below, alumina) and furthermore the promisingly high thermally conductive silicon carbide or boronitride, aluminum nitride, and other such materials are being used. Further, for the resins, if thermal pads or thermally conductive adhesives, silicone resins are generally used, while for the semiconductor sealants, epoxy resins are generally used.

Overall, fillers are higher in thermal conductivity than resins, so as means for improving the thermal conductivity of these materials, many methods are being researched aimed at raising the loading of fillers added to the resins so as to increase the thermal conductivity.

In PTL 1, as a filler, average particle size 80 μm or more spherical particles and average particle size 0.5 to 7 μm aspherical fine particles are combined in a predetermined volume ratio so as to obtain high thermal conductivity.

In PTL 2, as a filler, research has also been conducted on combining large sized spherical particles with a peak value of particle size distribution of 30 μm or more, small sized aspherical fine particles with a peak value of 5 μm or less, and medium sized aspherical particles between these so as to aim to further make the thermal conductivity higher.

In PTL 3, as a filler, research has also been conducted on combining average particle size 30 to 60 μm coarse particles, 0.1 or more and less than 7 μm ultrafine particles, and fine particles of particle sizes between these, in particular using particles with high contents of α-alumina crystals, so as to aim to further make the thermal conductivity higher.

CITATIONS LIST

Patent Literature

[PTL 1] Japanese Patent No. 5085050
[PTL 2] Japanese Patent No. 5345340
[PTL 3] Japanese Unexamined Patent Publication No. 2007-153969

SUMMARY

Technical Problem

In the above way, much research is being conducted on raising the loading of inorganic filler so as to improve the thermal conductivity. However, in PTLs 1 and 2, aspherical particles are being used for the fine particles or small sized particles. This is because aspherical particles are larger in contact area of those particles and give greater thermal conductivity compared with spherical particles. Furthermore, to increase the thermal conductivity, aspherical fine particles or small sized particles are used so as to raise the filler loading. However, when kneading a resin and aspherical particles, relatively, the ratio of the resin is low and the contact area of the aspherical particles is large, so the viscosity of the resin composition increases, the fluidity of the resin composition is impaired, and the work efficiency is liable to be adversely affected.

In PTL 3, in the examples, alumina particles containing a content of α-alumina of 90% or more are being used. These are so as to improve the thermal conductivity by using alumina particles containing large amounts of α-crystals. Further, these alumina particles are obtained by crushing and disintegration. That is, as alumina particles, aspherical particles are being used. For this reason, for the same reasons as explained above, the fluidity of the resin composition ends up being impaired.

Therefore, the present invention has as its technical problem to provide a spherical alumina particle mixture able to improve the thermal conductivity and keep down the viscosity of a resin composition formed when kneading it with a resin, a method for producing the same, and a resin composite composition and resin composite body each containing that spherical alumina particle mixture.

Solution to Problem

The present invention was made as a result of intensive study to solve the above technical problems and has as its gist the following as described in the claims:

(1) A spherical alumina particle mixture wherein
   in a particle size distribution measured by a wet sieving test method, 180 μm or more particles account for 0.04 wt % or less,
   an α-alumina crystal content rate is 45% or more,
   a specific surface area is 0.3 to 1.0 m²/g, and
   a roundness is 0.85 or more.
(2) The spherical alumina particle mixture of (1), containing at least three types or more of particles selected from the group comprising spherical alumina particles (a) with an average particle size (D50) of 30 to 160 μm and with a roundness of 0.90 or more, spherical alumina particles (b) with a D50 of 4 to 12 μm and with a roundness of 0.90 or more, spherical alumina particles (c) with a D50 of 2 to 3 μm and with a roundness of 0.90 or more, and spherical alumina particles (d) with a D50 of 0.8 to 1.0 μm and with a roundness of 0.90 or more, containing the spherical alumina particles (a) in 50 to 80 wt %, the spherical alumina particles (b) in 10 to 30 wt %, and the spherical alumina particles (d) in 5 to 30 wt % and having a total of the spherical alumina particles (a), spherical alumina particles (b), and spherical alumina particles (d) of 90 wt % or more, and having a specific surface area of 0.3 to 1.0 m²/g.

(3) The spherical alumina particle mixture of (1), containing at least three types or more of particles selected from the group comprising spherical alumina particles (a) with an average particle size (D50) of 30 to 160 μm and with a roundness of 0.90 or more, spherical alumina particles (b) with a D50 of 4 to 12 μm and with a roundness of 0.90 or more, spherical alumina particles (c) with a D50 of 2 to 3 μm and with a roundness of 0.90 or more, and spherical alumina particles (d) with a D50 of 0.8 to 1.0 μm and with a roundness of 0.90 or more, containing the spherical alumina particles (a) in 50 to 80 wt %, the spherical alumina particles (b) in 10 to 40 wt %, and the spherical alumina particles (c) in 5 to 30 wt % and having a total of the spherical alumina particles (a), spherical alumina particles (b), and spherical alumina particles (c) of 90 wt % or more, and having a specific surface area of 0.3 to 1.0 m²/g.

(4) The spherical alumina particle mixture of (1), containing at least four types or more of particles selected from the group comprising spherical alumina particles (a) with an average particle size (D50) of 30 to 160 μm and with a roundness of 0.90 or more, spherical alumina particles (b) with a D50 of 4 to 12 μm and with a roundness of 0.90 or more, spherical alumina particles (c) with a D50 of 2 to 3 μm and with a roundness of 0.90 or more, and spherical alumina particles (d) with a D50 of 0.8 to 1.0 μm and with a roundness of 0.90 or more, containing the spherical alumina particles (a) in 50 to 70 wt %, the spherical alumina particles (b) in 10 to 30 wt %, the spherical alumina particles (c) in 10 to 30 wt %, and the spherical alumina particles (d) in 5 to 30 wt % and having a total of the spherical alumina particles (a), spherical alumina particles (b), spherical alumina particles (c), and spherical alumina particles (d) of 90 wt % or more, and having a specific surface area of 0.3 to 1.0 m²/g.

(5) The spherical alumina particle mixture according to any one of (1) to (4), wherein each of the spherical alumina particles (a) to (d) is produced by a flame melting method or a VMC method.

(6) A resin composite composition comprising a resin containing a spherical alumina particle mixture according to any of (1) to (5).

(7) A resin composite body comprised of the resin composite composition according to (6) which is cured.

(8) A method for producing spherical alumina particle mixture according to any of (1) to (4), which method for producing a spherical alumina particle mixture comprising mixing at least three types or more of particles selected from the group comprising spherical alumina particles (a) with an average particle size (D50) of 30 to 160 μm and with a roundness of 0.90 or more, spherical alumina particles (b) with a D50 of 4 to 12 μm and with a roundness of 0.90 or more, spherical alumina particles (c) with a D50 of 2 to 3 μm and with a roundness of 0.90 or more, and spherical alumina particles (d) with a D50 of 0.8 to 1.0 μm and with a roundness of 0.90 or more.

Advantageous Effects of Invention

According to one embodiment of the present invention, it is possible to provide a thermal pad, thermally conductive adhesive, and semiconductor sealant improved in thermal conductivity and further provide an alumina particle mixture able to keep down the viscosity of a resin composition formed when kneading the mixture with a resin and a method for producing the same. Further, according to one embodiment of the present invention, a resin composite composition and resin composite body containing that spherical alumina particle mixture are also provided. Furthermore, according to one embodiment of the present invention, the alumina particle mixture prepared by particles of sizes within predetermined ranges in preferable ranges of blending rates can provide a thermal pad, heat dissipating grease, and semiconductor sealant having a high thermal conductivity of 5.0 W/mK or more.

DESCRIPTION OF EMBODIMENTS

Figure 1:
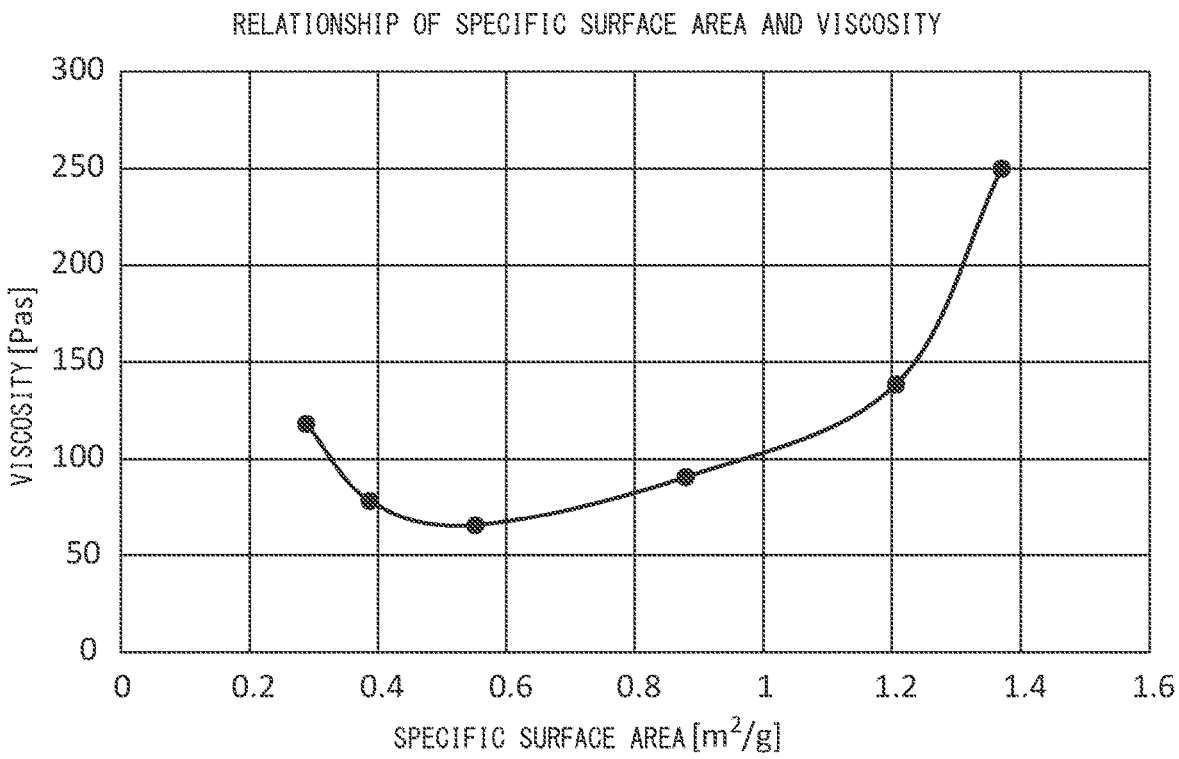
FIG. 1 is a chart showing a relationship between a specific surface area and fluidity (viscosity) of an alumina particle mixture of one embodiment of the present invention.

The inventors engaged in intensive studies to obtain an alumina particle mixture high in thermal conductivity and excellent in fluidity (more particularly, if kneaded with a resin, an alumina particle mixture with a high thermal conductivity and low viscosity of the resin mixture). The inventors discovered that among these, there is a correlation between the specific surface area and thermal conductivity of the spherical alumina particle mixture, there is a correlation between the specific surface area and fluidity of the spherical alumina particle mixture, and there is a correlation between the α-alumina crystal content rate and thermal conductivity of the spherical alumina particle mixture. Based on the discoveries, the inventors completed the present invention. More specifically, the inventors completed a desired spherical alumina particle mixture high in thermal conductivity and excellent in fluidity by controlling the α-alumina crystal content rate and specific surface area in a spherical alumina particle mixture to desired ranges and a method for producing the same, and a resin composite composition and resin composite body containing that spherical alumina particle mixture.

The spherical alumina particle mixture provided by one embodiment of the present invention is characterized in that in a particle size distribution measured by a wet sieving test method, 180 μm or more particles account for 0.04 wt % or less, an α-alumina crystal content rate is 45% or more, a specific surface area is 0.3 to 1.0 m²/g, and a roundness is 0.85 or more.

(In a Particle Size Distribution Measured by a Wet Sieving Test Method, 180 μm or More Particles Account for 0.04 wt % or Less)

The spherical alumina particles according to the present embodiment sometimes are mixed with a resin and used as a semiconductor sealant. A sealed semiconductor element sometimes has numerous interconnects arranged at a high density. The distance between the interconnects is sometimes narrow. If the spherical alumina particles have a particle size distribution in which 180 μm or more particles exceed 0.04 wt %, they are liable to be unable to pass between the narrow spacing between interconnects. Note that, the "weight ratio" referred to here is based on the spherical alumina particles as a whole, that is, 100 wt %.

Similarly, the spherical alumina particles sometimes are mixed with a resin and used for thermal pads, thermally conductive adhesives, and other heat dissipating members. These heat dissipating members are compressed by pressure etc. and used for making it easier for heat to be conducted to other members. If the spherical alumina particles have a particle size distribution in which 180 μm or more particles exceed 0.04 wt %, at the time of compression, the compression is liable to be impaired by the 180 μm or more coarse particles.

Therefore, the spherical alumina particle mixture according to the present embodiment contains 180 μm or more particles in 0.04 wt % or less so that it can pass through even the narrow spacing between interconnects or the heat dissipating member can be sufficiently compressed. Alternatively, it is substantially not given a distribution of 180 μm or more. Note that, it is possible to suitably adjust the maximum value of the particle size distribution in accordance with the interconnect spacing, thickness to be compressed, and other aspects of the usage environment. For example, the maximum value of the particle size distribution may be made 150 μm and may be made 120 μm. In other words, in the particle size distribution, 150 μm or more particles may account for 0.04 wt % or less while 120 μm or more particles may account for 0.04 wt % or less.

Note that, the "wet sieving test method" adds 10 g of spherical alumina particles to be tested and water to a container and uses ultrasonic waves to make the spherical particles sufficiently disperse to prepare a slurry. The slurry is transferred onto the mesh of a test sieve and sieved. The particles remaining on the mesh of the test sieve are taken in a suitable container. The sample is evaporated to dryness using a hot plate etc., the weight of the residue is measured, and the ratio of the weight of the sieved particles in the 10 g of the spherical alumina particles to be tested is calculated.

(α-Alumina Crystal Content Rate of 45% or More)

It is known that alumina has differences in thermal conductivity depending on the crystalline system. α-alumina is a crystal highest in thermal conductivity. Therefore, by using alumina powder containing a large amount of α-alumina, it is possible to improve the thermal conductivity of an insulating resin composition. In this regard, the higher the α-alumina crystal content rate (the ratio of α-alumina in the crystals contained in the alumina particle mixture) of the spherical alumina particle mixture powder, the higher the thermal conductivity of that alumina particle mixture and the more preferable.

On the other hand, α-alumina is obtained by treating the starting material at a high temperature to make the crystals grow. For example, aluminum hydroxide or alumina is generally obtained by heating at a high temperature. The heating can be performed by the method of firing in a furnace, heating by high temperature hot water, etc. Further, from the viewpoint of efficiently obtaining α-particles having the desired particle size, the general practice is to crush or disintegrate the coarsened α-particles after heating. For this reason, α-alumina particles with small particle size are often aspherical particles with low roundness. In other words, it is difficult to selectively collect just spherical particles from α-alumina particles with small particle size. Trying to realize that would require high costs.

The inventors discovered that, as explained in detail later, by controlling the specific surface area of the spherical alumina particle mixture powder to a specific range, it is possible to obtain a high thermal conductivity and excellent fluidity and in addition that if the α-alumina crystal content rate of the spherical alumina particle mixture powder at that time is 45% or more, a sufficiently high thermal conductivity is obtained.

If the α-alumina crystal content rate of the spherical alumina particle mixture powder is less than 45%, sometimes the resin composition obtained by mixing that spherical alumina particle mixture cannot be given a sufficiently high thermal conductivity. Therefore, the spherical alumina particle mixture according to the present embodiment has an α-alumina crystal content rate of 45% or more so that the resin composition obtained by mixing that spherical alumina particle mixture can be given a sufficiently high thermal conductivity. Note that, the α-alumina crystal content rate may be suitably adjusted so that the desired thermal conductivity is obtained. For example, the lower limit value of the α-alumina crystal content rate may be made 55% or more and may be made 65% or more. Further, from the viewpoint of improvement of the specific surface area of the spherical alumina particles and the control of the asperities on the particle surfaces and affinity with a resin, the upper limit of the α-alumina crystal content rate may be made less than 90%, may be made less than 85%, or may be made less than 75%. If suitably adjusting the desired α-alumina crystal content rate, it is possible to measure the α-alumina crystal content rate of the spherical alumina particle mixed in in advance and use the measured α-alumina crystal content rate and blending ratio for calculation so as to adjust the mixture to the desired α-alumina crystal content rate.

<Measurement of α-Alumina Crystal Content Rate>

The α-alumina crystal content rate is measured using a powder X-ray diffraction device. The cumulative area of the diffraction peaks obtained is found and the ratio of the area of the diffraction peaks derived from α-alumina with respect to the total is analyzed by the Reitveld method.

(Specific Surface Area of 0.3 to 1.0 m²/g)

Figure 2:
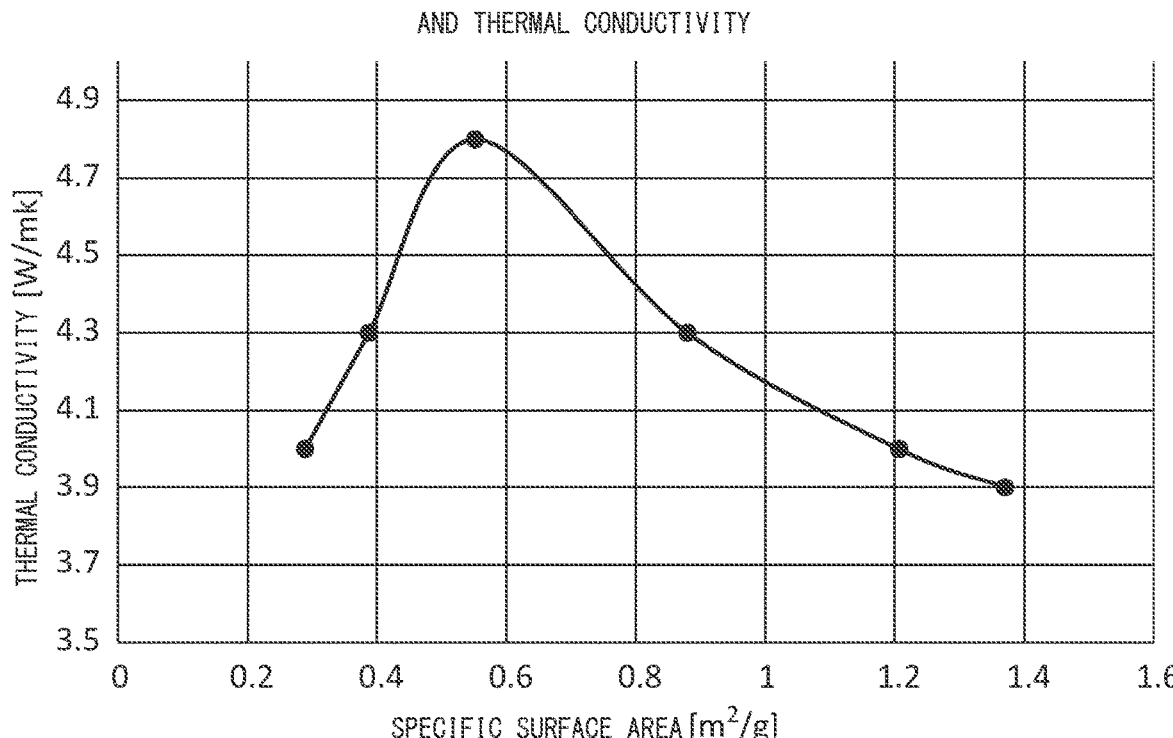
FIG. 2 is a chart showing a relationship between a specific surface area and thermal conductivity of an alumina particle mixture of one embodiment of the present invention.

The inventors discovered that the specific surface area of the spherical alumina particle mixture powder is correlated with the thermal conductivity and fluidity (viscosity). FIG. 1 is a chart showing a relationship between a specific surface area and fluidity (viscosity) of a spherical alumina particle mixture, while FIG. 2 is a chart showing a relationship between a specific surface area and thermal conductivity of a spherical alumina particle mixture. Viscosity, as shown in FIG. 1, is a characteristic which becomes an extremely small value with respect to the specific surface area in a certain range of the specific surface area, while thermal conductivity, as shown in FIG. 2, is a characteristic which becomes an extremely large value with respect to the specific surface area in a certain range of the specific surface area.

Note that, if spherical particles differing in particle sizes are present in equal weights, the numbers of particles become greater the smaller the particle sizes and the specific surface areas become greater the smaller the particle sizes. Therefore, it is possible to suitably adjust the blending ratios when combining spherical particles of different particle sizes so as to obtain the desired specific surface area of the spherical alumina particle mixture powder. In general, in a spherical alumina particle mixture powder, if the weight ratio of particles with a large particle size becomes higher, the specific surface area falls, while if the weight ratio of particles with a small particle size becomes higher, the specific surface area rises.

Here, how heat is conducted and how the thermal conductivity changes in a typical resin composition obtained by mixing particles (filler) with a resin will be explained. In general, a filler is higher in thermal conductivity compared with a resin. Further, in general, the thermal conductivity changes due to the method of formation of the paths over which heat is conducted (below; "thermal conduction paths"). For example, if thermal conduction paths which mostly pass through the resin are formed, the thermal conductivity falls, while if thermal conduction paths which mostly pass through the filler are formed, the thermal conductivity rises.

Further, if the thermal conduction paths are equal distances, comparing thermal conduction paths passing through only the filler (for example, thermal conduction paths passing through filler particles with a large particle size) and thermal conduction paths with large numbers of points of contact between filler particles (for example, thermal conduction paths passing through a plurality of filler particles with small particle sizes), the greater the number of points of contact between filler particles, the worse the thermal conductivity (because the heat is lost at the points of contact and the conduction of heat becomes worse). However, if the number of points of contact of the filler particles is small, the length over which heat passes in the resin becomes greater than the length over which heat passes through inside of the filler, so the thermal conductivity ends up becoming worse, therefore a certain extent of points of contact between filler particles is necessary.

Next, consider the viscosity. If mixing a filler with a resin, the resin can be separated into two parts: one entering into the gaps between the particles and one present at the outside of the particles and contributing to the fluidity. At this time, if the gaps between particles are large and if the gaps are small, but present in a large number, a lot of resin easily flows into the gaps, the amount of resin contributing to the fluidity becomes smaller, and the viscosity becomes higher. Conversely, if the gaps are small and present in a small number, it becomes difficult for the resin to flow in, the amount of resin contributing to the fluidity becomes greater, and the viscosity falls.

Based on the above, the correlation of the specific surface area of the spherical alumina particle mixture powder with the thermal conductivity and fluidity (viscosity) which the inventors discovered will be explained.

First, consider the case where the specific surface area of the particle mixture powder is small. If the specific surface area is small, the ratio of large particles is large, so there are many large gaps present between the particles, resin flows into the gaps, and less resin contributes to the fluidity, so the viscosity deteriorates. Further, regarding the thermal conductivity, the large particles contact each other and paths for conduction of heat (below, "thermal conduction paths") are formed, but in increasing cases heat passes through the resin with the few points of contact, so the thermal conductivity becomes lower.

If adding particles with small particle size a little at a time in this state to increase the specific surface area, small particles are filled in the gaps instead of the resin and the resin which had entered the gaps is driven out from the gaps and becomes resin contributing to fluidity. The specific surface area at this time rises, so as shown in FIG. 1, the larger the specific surface area, the more the viscosity falls.

At this time, if combining spherical particles with large particle size and spherical particles with small particle size, it is possible to greatly lower the viscosity over the case of combining angular particles. This is believed to be because if making large and small particles flow in a state of contact, the spherical particles will rotate inside the resin (due to spherical particles rotating, force is efficiently passed along like with bearings and friction between particles is decreased).

Further, for the thermal conductivity, the fine particles enter the gaps between large particles whereby the points of contact between particles increase. Due to this, the thermal conduction paths are increased and the thermal conductivity is improved.

If further adding small particles in this state, the particles become densely filled and the viscosity falls, but if adding a certain fixed amount, this time the opportunities for contact between the particles become greater and spherical particles can no longer rotate well, so the force applied can no longer be passed along and the particles no longer flow, so the viscosity starts to deteriorate. Due to this, as shown in FIG. 1, if the specific surface area exceeds a certain value, it becomes a factor behind a rise in viscosity along with an increase in the specific surface area.

Regarding the thermal conductivity, if the specific surface area becomes larger, the amount of large particles is relatively reduced, so if exceeding a certain specific surface area, the thermal conduction paths running through just the filler become fewer and the thermal conductivity of the bulk starts to fall. Furthermore, if the amount of particles smaller than the large particles increases, contact between small particles will increase and the contact heat resistance between filler will increase, so the thermal conductivity will further deteriorate.

Based on the above, the specific surface area of the spherical alumina particle mixture powder is 0.3 to 1.0 m$^2$/g, more preferably 0.35 to 1.0 m$^2$/g, still more preferably 0.4 to 1.0 m$^2$/g. By this range of specific surface area, a high thermal conductivity and fluidity are obtained.

<Measurement of Specific Surface Area>

The specific surface area is measured by the BET method. Typically, the following procedure is used to measure the specific surface area.

About 5 g of a sample is measured out and vacuum dried at 250° C. for 5 minutes. Next, the sample is set at an automatic specific surface area measuring device (Macsorb made by Mountech). Using pure nitrogen and a mixed nitrogen-helium gas (mixture ratio of nitrogen 30%, He 70%), the nitrogen gas adsorption at a 77K measurement temperature and a relative pressure P/P$_0$ of a 0.291 value is measured and the BET specific surface area is calculated by the one-point method.

(Spherical Alumina Particle Mixture)

The spherical alumina particle mixture in the present embodiment is obtained by mixing spherical alumina particles of a plurality of particle sizes. "Spherical" means a roundness of the spherical alumina particle mixture of 0.85 or more, preferably 0.9 or more. The particles of all of the particle sizes of the respective spherical alumina particles forming the spherical alumina particle mixture preferably are also alumina particles with a roundness of 0.85 or more, more preferably are alumina particles with a roundness of 0.9 or more. This is because if the roundness of the alumina particle mixture is less than 0.85, sometimes the hardness of the shaped body obtained by kneading that alumina particle mixture and a resin and the viscosity of the liquid kneaded matter end up greatly deteriorating. Particles with low roundness such as angular particles easily are formed with flat parts on the particle surfaces compared with true spherical particles. For this reason, when particles contact each other, true spherical particles contact each other at points, while particles with low roundness such as angular particles contact each other at planes and friction easily occurs. For this reason, if the particles try to flow, angular particles with large friction have difficulty moving and the hardness and viscosity of the shaped body end up deteriorating. These inconveniences become harder to occur the higher the roundness. For this reason, the higher the roundness, the better. It may be 0.90 or more and further may be 0.91 or more. On the other hand, the roundness is theoretically 1.0 as an upper limit, but making the roundness 1.0 is realistically difficult. Further, from the viewpoint of improvement of the specific surface area of the spherical alumina particles and the control of the asperities of the particle surfaces and affinity with a resin, the upper limit of the roundness may be made 0.99 or less, 0.98 or less, and 0.97 or less. The roundnesses of the respective spherical alumina particles can be adjusted using thermal spraying (flame melting method) etc. Specifically, they can be adjusted by maintaining the temperature of the flame at the melting point of alumina or more. If becoming a temperature of the melting point of alumina or less, the alumina material becomes difficult to melt and the roundness deteriorates. The temperature of the flame can be adjusted by the flow rate of the fuel gas used etc.

<Measurement of Roundness>

The roundness can be measured using an electron microscope or optical microscope and image analyzing device. For example, an FPIA made by Sysmex etc. may be used. These apparatuses are used to measure the roundness (circumference of area equivalent circle/circumference of projected image of particle). The roundnesses are measured for 100 or more particles and the average value is made the roundness of the powder.

(Blending of Spherical Alumina Particle Mixture)

A spherical alumina particle mixture can be obtained by blending spherical alumina particles having different average particle sizes. The ratio of composition can be suitably adjusted in accordance with the properties of the spherical alumina particles blended (specific surface area, α-alumina crystal content rate, etc.) so as to obtain the desired properties of the spherical alumina particle mixture powder.

As the spherical alumina particles to be blended, spherical alumina particles (a) to (d) having the following average particle sizes can be used.

Spherical alumina particles (a): Spherical alumina particles with an average particle size (D50) of 30 to 160 μm and a roundness of 0.90 or more.

Spherical alumina particles (b): Spherical alumina particles with an average particle size (D50) of 4 to 12 μm and a roundness of 0.90 or more.

Spherical alumina particles (c): Spherical alumina particles with an average particle size (D50) of 2 to 3 μm and a roundness of 0.90 or more.

Spherical alumina particles (d): Spherical alumina particles with an average particle size (D50) of 0.8 to 1.0 μm and a roundness of 0.90 or more.

It is possible to classify the spherical alumina particles (a) to (d) in the order of the magnitude of the average particle size. The spherical alumina particles (a) to (d), for convenience, will sometimes also respectively be called the "large particles" (or "coarse powder"), "medium particles" (or "medium powder"), "fine particles" (or "fine powder"), and "ultrafine particles" (or "ultrafine powder").

<Measurement of Average Particle Size>

The average particle size of the alumina particles is measured by the laser diffraction/scattering method. For the device, a MS3000 made by Malvern is used. The measurement is performed using water as a dispersion medium. The "average particle size" referred to in this Description, unless particularly indicated otherwise, is the one called the "median diameter". The laser diffraction method or other method is used to measure the particle size distribution and the particle size giving a cumulative frequency of particle size of 50% is made the "average particle size (D50)".

The spherical alumina particle mixture preferably contains at least three or more types of particles selected from the group comprising the above spherical alumina particles (a) to (d). The spherical alumina particles (a) to (d) differ from each other in average particle size. Particles of small average particle sizes can enter in the gaps between particles of large average particle size and the thermal conductivity of the gaps is improved. This is because heat can be conducted not through the gaps, that is, spaces, but through the small particles entering into them. By containing particles of at least three types of average particle size, furthermore, another relationship of magnitude stands and, furthermore, the thermal conductivity can be improved.

Further, the spherical alumina particles (a) to (d) all have roundnesses of 0.90 or more, so a spherical alumina particle mixture obtained by blending these also can be given a 0.90 or more roundness. By the roundness being 0.9 or more, as explained above, it is possible to keep the hardness of a shaped body obtained by kneading the alumina particle mixture and a resin and the viscosity of the liquid kneaded matter from greatly deteriorating.

The spherical alumina particles (a) to (d) can be suitably adjusted in their blending ratios (ratios of composition) so as to be able to obtain the desired properties of the spherical alumina particle mixture powder. As typical blending ratios, the following blending ratios (ratios of composition) may also be used.

Blending ratio 1: The spherical alumina particles (a) in 50 to 80 wt %, the spherical alumina particles (b) in 10 to 30 wt %, and the spherical alumina particles (d) in 5 to 30 wt % are blended. The total of the spherical alumina particles (a), spherical alumina particles (b), and spherical alumina particles (d) is made 90 wt % or more or made more than 90 wt %. Preferably, the total of the spherical alumina particles (a), spherical alumina particles (b), and spherical alumina particles (d) is 95 mass % or more, more preferably 98 mass % or more, still more preferably 100 mass %. To enable the desired properties to be obtained, the spherical alumina particles (a) may be made 55 wt % or more or 60 wt % or more and may also be made 78 wt % or less or 75 wt % or less; the spherical alumina particles (b) may also be made 14 wt % or more, 16 wt % or more, or 18 wt % or more or 25 wt % or less or 20 wt % or less; the spherical alumina particles (d) may also be made 10 wt % or more or 15 wt % or more and may be made 25 wt % or less or 20 wt % or less.

Blending ratio 2: The spherical alumina particles (a) in 50 to 80 wt %, spherical alumina particles (b) in 10 to 40 wt %, and spherical alumina particles (c) in 5 to 30 wt % are blended. The total of the spherical alumina particles (a), spherical alumina particles (b), and spherical alumina particles (c) is made 90 wt % or more or made more than 90 wt %. Preferably, the total of the spherical alumina particles (a), spherical alumina particles (b), and spherical alumina particles (c) is 95 mass % or more, more preferably 98 mass % or more, still more preferably 100 mass %. To enable the desired properties to be obtained, the spherical alumina particles (a) may be made 55 wt % or more or may be made 60 wt % or more and may be made 75 wt % or less or 70 wt % or less; the spherical alumina particles (b) may be made 10 wt % or more or 15 wt % or more and may be made 35 wt % or less or 30 wt % or less; and the spherical alumina particles (c) may be made 10 wt % or more or 15 wt % or more and may be made 25 wt % or less or 20 wt % or less.

Blending ratio 3: The spherical alumina particles (a) in 50 to 70 wt %, the spherical alumina particles (b) in 10 to 30 wt %, the spherical alumina particles (c) in 10 to 30 wt %, and the spherical alumina particles (d) in 5 to 30 wt % are blended. The total of the spherical alumina particles (a), spherical alumina particles (b), spherical alumina particles (c), and spherical alumina particles (d) is made 90 wt % or more or made more than 90 wt %. Preferably, the total of the spherical alumina particles (a), spherical alumina particles (b), spherical alumina particles (c), and spherical alumina particles (d) is 95 mass % or more, more preferably 98 mass % or more, still more preferably 100 mass %. To enable the desired properties to be obtained, the spherical alumina particles (a) may be made 55 wt % or more, may further be made 60 wt % or more and may be made 65 wt % or less, may further be made 60 wt % or less; the spherical alumina particles (b) may be made 13 wt % or more, 15 wt % or more, or 17 wt % or more and may be 25 wt % or less or 20 wt % or less; and the spherical alumina particles (c) may be made 13 wt % or more, 15 wt % or more, or 17 wt % or more and may be 25 wt % or less or 20 wt % or less; and the spherical alumina particles (d) may be made 10 wt % or more, 14 wt % or more, or 15 wt % or more and may be made 25 wt % or less or 20 wt % or less.

The spherical alumina particle mixtures blended by the blending ratios 1 to 3 can give the desired specific surface areas and other properties. In more detail, the specific surface areas of the spherical alumina particle mixtures powder etc. are 0.3 to 1.0 $m^2/g$, preferably 0.35 to 1.0 $m^2/g$, more preferably 0.4 to 1.0 $m^2/g$.

The above blending ratios 1 to 3 exhibit the effects of blending of particles below.

The fact that the blending rate of the alumina spherical particles (a) has the two effects of forming thermal conduction paths whereby heat is conducted inside the filler and lowering the viscosity has been confirmed by the inventors. This is because if the blending rate of the alumina spherical particles (a) is small, the amount of relatively small particles increases, thermal conduction paths are formed by contact of the small particles with each other, and the thermal conductivity ends up falling. Furthermore, the specific surface area unnecessarily increases and becomes a factor behind deterioration of the viscosity. Further, if the blending rate of the alumina spherical particles (a) becomes excessive, the blended amount of the small particles becomes relatively smaller, large gaps are easily formed between filler particles, and resin flows into the gaps thereby becoming a factor causing the viscosity to deteriorate.

The blending rate of the alumina spherical particles (b) has the effect of burying the large gaps between large particles, increasing the contact points of the filler, and improving the thermal conductivity. The alumina spherical particles (b) are smaller in specific surface area compared with the alumina spherical particles (c) or (d), so no matter how great the blended amount, there is almost no detrimental effect on the viscosity. However, if a certain fixed amount or more is mixed in, the gaps between the large size alumina spherical particles (a) are almost entirely buried and the excess medium size alumina spherical particles (b) are made to increase in specific surface area to cause deterioration of the viscosity.

The alumina spherical particles (c) have the effect of adjusting the specific surface area of the spherical alumina particle mixture powder and burying the small gaps to thereby lower the viscosity. However, as explained previously, if the blending rate is made too large, the specific surface area becomes too large and becomes a factor causing the viscosity to end up deteriorating.

The effect of blending in alumina spherical particles (d) is similar to that of alumina spherical particles (c). However, the specific surface area is larger than (c), so in blending effect as well, a higher effect than (c) is obtained.

Note that, in the blending ratios 1 to 3, particles other than the composition forming the blending ratios 1 to 3 (below, referred to as "the other particles") may also be contained to an extent not impairing the effects of blending of the respective spherical alumina particles (a) to (d) or the properties of the spherical alumina mixtures obtained by the blending ratios 1 to 3.

As the other particles, known inorganic particles can be used. $CaCO_3$, $BaSO_4$, talc, mica, kaolin clay, ulastonite, sepiolite, hydrotalcite, montmorillonite, potassium titanate, aluminum borate, silica, titanium oxide, zinc oxide, alumina, magnesium oxide, aluminum hydroxide, magnesium hydroxide, boronitride, aluminum nitride, carbon black, and graphite may be mentioned. Preferably, they are silica, zinc oxide, alumina, magnesium oxide, boronitride, and aluminum nitride, more preferably alumina, from which an excellent dimensional stability or thermal conductivity when made a resin composite body can be expected.

When the other particles are alumina, from the viewpoint of not impairing the properties of the spherical alumina mixture, among the spherical alumina particles (a) to (d), spherical alumina particles other than the composition forming the blending ratios 1 to 3 are preferably not contained. Specifically, in the case of the blending ratio 1, the spherical alumina particles (c) are preferably not contained while in the case of the blending ratio 2, the spherical alumina particles (d) are preferably not contained.

The blended amount of the other particles, from the viewpoint of not impairing the properties of the spherical alumina mixture, is 10 wt % or less of the spherical alumina mixture, further is preferably less than 10 wt %, more preferably less than 5 wt %, still more preferably less than 2 wt %, still more preferably 0 wt %.

The D50 of the other particles is not limited if in a range not impairing the properties of the spherical alumina mixture, but is preferably 0.1 to 150 μm.

(Material of Spherical Alumina Particles)

As the material of the spherical alumina particles, alumina powder, aluminum hydroxide powder, etc. is used. Further, metal aluminum may also be used.

(Method for Producing Spherical Alumina Particles)

The spherical alumina particles can be produced by the flame melting method or VMC method.

The flame melting method is one type of the known thermal spraying methods. It sprays the particle material into a flame to make the material spherical. At this time, it is possible to adjust the average sphericity by the amount introduced into the flame per time or by the type of fuel gas. Further, by adjusting the particle sizes of the powder material used, it is possible to adjust the particle size of the spherical alumina powder. The content of the α-alumina can be improved by maintaining the temperature inside the melting furnace high. The temperature inside the melting furnace is preferably 1200° C. or more from the viewpoint of promoting the crystal growth of the α-alumina. Further, it is possible to rapidly cool the spherical particles right after solidification by air, water, or other cooling medium to thereby lower the content. The cooling medium is not particularly limited, but from the viewpoint of not causing a drop in the purity of the spherical particles, air or distilled water or ion exchanged water not containing impurities such as sodium ions, chlorine ions, etc. is preferable.

The VMC method is the method of forming a chemical flame by a burner in an atmosphere containing oxygen, introducing metal powder in this chemical flame in an amount of an extent where a dust cloud is formed, and causing deflagration to obtain spherical oxide particles. Using the VMC method (deflagration method), it is possible to cause a reaction between the aluminum or other metal material and oxygen to obtain alumina or another metal oxide.

Spheroided alumina particles can if necessary be separated into coarse particles and fine particles by a cyclone separator etc. The thus obtained spherical alumina particles can be cleared of 180 μm or more particles and classified into particles of the desired average particle size by a sieve having a predetermined mesh or by an air classifier etc. The size of the mesh used is not particularly limited if 180 μm or less.

(Mixing)

Regarding the mixing method, a rocking mixer or V-type mixer, air blender, or other known method is used for mixing. At the time of mixing, to keep the roundness of the spherical alumina particles from dropping and the desired roundness of the spherical alumina particle mixture from not being obtained, the mixing conditions may be suitably adjusted. Typically, the mixing time period and the mixing density etc. may be adjusted.

The thermal conductivity and fluidity (viscosity) of a spherical alumina particle mixture itself are difficult to measure. Therefore, for the thermal conductivity, that spherical alumina particle mixture is mixed with a resin under predetermined conditions, the thermal conductivity of the obtained resin composition is measured, and the thermal conductivity of that spherical alumina particle mixture is evaluated based on these measurement results. Further, for the fluidity (viscosity) as well, that spherical alumina particle mixture is mixed with a resin under predetermined conditions, the fluidity (viscosity) of the obtained resin composition is measured, and the fluidity (viscosity) of that spherical alumina particle mixture is evaluated based on these measurement results.

<Measurement of Thermal Conductivity>

More specifically, the following procedure is used to measure the thermal conductivity. A spherical alumina particle mixture in 92 parts by mass, a silicon resin A (CY-52-276A made by Toray Dow Corning) in 4 parts by mass, and a silicon resin B (CY-52-276B made by Toray Dow Corning) in 4 parts by mass are mixed by a vacuum kneader. The obtained resin composition is poured into a mold and hot pressed to any thickness. The shaping conditions are a pressure of 6 MPa, a temperature of 120° C., and 1 hour. After heating, the shaped sheet is taken out from the mold and post-heated by a 140° C. dryer. The post-heated sheet is cooled. The prepared sheet is cut into a 20 mm square and measured for thermal conductivity using ASTM-D5470) under conditions of a pressure of 1.25 kgf/cm$^2$.

In an example using a spherical alumina particle mixture according to the present embodiment, if the filler loading is 92 wt %, the lower limit of the thermal conductivity may be 3.40 W/m·K, preferably may be 4.40 W/m·K. On the other hand, the upper limit of the thermal conductivity may be 5.10. Further, if the filler maximum loading of 95 wt %, the lower limit of the thermal conductivity may be 3.40 W/m·K, preferably may be 4.70 W/m·K, still more preferably may be 6.00 W/m·K, still more preferably may be 7.00 W/m·K. On the other hand, the upper limit of the thermal conductivity may be 8.00 W/m·K.

<Measurement of Fluidity (Viscosity)>

More specifically, the following procedure is used to measure the fluidity (viscosity). The spherical alumina particle mixture in 87 parts by mass and an epoxy resin (Epicoat 801N) in 13 parts by mass are mixed by a vacuum kneader, the obtained resin composition is made to cool by a water bath for 30 minutes, then a rheometer (MCR-101 made by Anton Paar) is used set with a 25 mm diameter parallel plate, gap of 0.5 mm, and temperature of 25° C. while changing the shear speed to measure the rotational viscosity. Two types of viscosity (Pa·s) of shear speeds of 1 [1/s] and 10 [1/s] are measured.

In an example using a spherical alumina particle mixture according to the present embodiment, the viscosity (shear speed 1/s) may have a lower limit of 50.0 or 60.0. On the other hand, the upper limit may be 510, preferably may be 350, more preferably may be 180, still more preferably may be 150, and even more preferably may be 100. The viscosity (shear speed 10/s) may have a lower limit of 50.0 or 60.0. On the other hand, the upper limit may be 270, preferably may be 200, more preferably may be 100, still more preferably may be 85.

(Applications of Spherical Alumina Particle Mixtures)

According to one aspect of the present invention, it is possible to produce a composite composition of the finally obtained spherical alumina particle mixture and a resin and, furthermore, a resin composite body obtained by curing that resin composite composition. The chemical composition etc. of the resin composite composition will be explained in detail below.

The slurry composition including the spherical alumina particle mixture and resin can be used to obtain a semiconductor sealant (in particular a solid sealant), an interlayer insulating film, or other resin composite composition. Furthermore, by curing these resin composite body compositions, it is possible to obtain a sealant (cured), semiconductor package substrate, and other resin composite bodies.

When producing the resin composite composition, for example, in addition to a spherical alumina particle mixture and resin, a curing agent, curing accelerator, flame retardant, silane coupling agent, etc. are blended in accordance with need and combined by kneading or another known method. Further, it is shaped into pellets, a film, etc. in accordance with the application.

Furthermore, if curing a resin composite composition to produce a resin composite body, for example, the resin composite composition is heated to make it melt, is processed into a shape corresponding to the application, and is made to completely cure by applying heat higher than the time of melting. In this case, transfer molding or another known method can be used.

For example, when producing a package use substrate or interlayer insulating film or other semiconductor related material, as the resin used for the resin composite composition, a known resin can be used, but preferably an epoxy resin is employed. The epoxy resin is not particularly limited, but for example a bisphenol A type epoxy resin, bisphenol F type epoxy resin, biphenyl type epoxy resin, phenol novolac type epoxy resin, cresol novolac type epoxy resin, naphthalene type epoxy resin, phenoxy type epoxy resin, etc. can be used. One type among these can be used alone or two or more types having different molecular weights can be used together. Among these as well, from the curability, heat resistance, etc., an epoxy resin having two or more epoxy groups in each molecule is preferable. Specifically, a biphenyl type epoxy resin, phenol novolac type epoxy resin, ortho-cresol novolac type epoxy resin, novolac resins of phenols and aldehydes which are epoxylated, bisphenol A, bisphenol F, bisphenol S, and other glycidyl ethers, a glycidyl ester acid epoxy resin obtained by a reaction between phthalic acid, dimer acid, or other poly basic acid and epochlorohydrin, a linear aliphatic epoxy resin, alicyclic epoxy resin, heterocyclic epoxy resin, alkyl modified polyfunctional epoxy resin, β-naphthol novolac epoxy resin, 1,6-dihydroxynaphthalene epoxy resin, 2,7-dihydroxynaphthalene epoxy resin, bishydroxy biphenyl epoxy resin resin and further an epoxy resin with bromine or other halogen introduced for imparting flame retardancy etc. may be mentioned. Among these epoxy resins having two or more epoxy groups in a molecule as well, in particular a bisphenol A type epoxy resin is preferable.

Further, as the resin used for applications other than a composite material for a semiconductor sealant, for example, a prepreg for a printed board, various engineering plastics, and other resin composite compositions, a resin other than an epoxy-based one can also be applied. Specifically, in addition to an epoxy resin, polyamides such as a silicone resin, phenol resin, melamine resin, urea resin, unsaturated polyester, fluororesin, polyimide, polyamideimide, and polyesterimide; polyesters such as poly butylene terephthalate and polyethylene terephthalate; polyphenylene sulfide, aromatic polyester, polysulfone, liquid crystal polymer, polyether sulfone, polycarbonate, modified maleimide resin, ABS resin, AAS (acrylonitrile-acryl rubber-styrene) resin, and AES (acrylonitrile-ethylene-propylene-diene rubber-styrene) resin may be mentioned.

As the curing agent used for the resin composite composition, a curing agent known for curing a resin may be used, but, for example, a phenolic curing agent can be used. As the phenolic curing agent, a phenol novolac resin, alkylphenol novolac resin, polyphenyl phenols, etc. can be used alone or in combinations of two or more types.

The amount of the phenol curing agent is preferably, by equivalent ratio with the epoxy resin (phenolic hydroxy group equivalent/epoxy group equivalent), 0.1 or more and less than 1.0. Due to this, unreacted phenol curing agent no longer remains and the moisture absorption and heat resistance are improved.

The amount of addition of the spherical alumina particle mixture of the present invention in the resin composite composition is preferably large from the viewpoint of the heat resistance and coefficient of thermal expansion, but is usually 70 mass % or more and 95 mass % or less, preferably 80 mass % or more and 95 mass % or less, more preferably suitably 85 mass % or more and 95 mass % or less. This is because if the amount of the alumina particle mixture is too small, the improvement of strength of the sealing material, suppression of thermal expansion, and other effects are difficult to obtain. Further, if conversely too large, regardless of surface treatment of the alumina particle mixture, in a composite material, segregation easily occurs due to aggregation of the alumina particle mixture, the viscosity of the composite material becomes too large, and other problems arise, so practical use as a sealing material becomes difficult.

Further, in addition to a resin, an additive, for example, a silane coupling agent, curing agent, coloring agent, curing retarder, or other known additive can be used.

Further, for the silane coupling agent, a known coupling agent may be used, but one having epoxy-based functional groups is preferable.

It is possible to use a slurry composition containing a spherical alumina particle mixture and a resin to obtain a thermal pad, heat dissipating grease, etc.

When obtaining a thermal pad, a spherical alumina particle mixture and resin and also additives are suitably mixed and combined by kneading or another known method. The obtained composite is shaped into a sheet by a known method.

For example, if producing a thermal pad, as the resin used for the resin composite composition, a known resin can be applied, but specifically polyamides such as a silicone resin, phenol resin, melamine resin, urea resin, unsaturated polyester, fluororesin, polyimide, polyamideimide, polyetherimide, etc.; polyester such as poly butylene terephthalate and polyethylene terephthalate; polyphenylene sulfide, aromatic polyester, polysulfone, liquid crystal polymer, polyether sulfone, polycarbonate, modified maleimide resin, ABS resin, AAS (acrylonitrile-acrylic rubber styrene) resin, and AES (acrylonitrile ethylene propylene diene rubber-styrene) resin may be mentioned. Among these as well, a silicone resin is preferably used. The silicone resin is not particularly limited, but, for example, a peroxide curing type, addition curing type, condensation curing type, ultraviolet curing type, etc. can be used.

Further, in addition to a resin, an additive, for example, a silane coupling agent, curing agent, coloring agent, curing retarder, or other known additive can be used.

When obtaining a heat dissipating grease, a spherical alumina particle mixture and resin and also additives are suitably mixed and combined by kneading or another known method. Here, the resin used for the heat dissipating grease will also be referred to as the "base oil".

For example, if producing a heat dissipating grease, as the resin used for the resin composite composition, a known resin is possible, but specifically polyamides such as a silicone resin, phenol resin, melamine resin, urea resin, unsaturated polyester, fluororesin, polyimide, polyamideimide, and polyesterimide; polyesters such as poly butylene terephthalate and polyethylene terephthalate; polyphenylene sulfide, aromatic polyester, polysulfone, liquid crystal polymer, polyether sulfone, polycarbonate, modified maleimide resin, ABS resin, AAS (acrylonitrile-acryl rubber-styrene) resin, AES (acrylonitrile-ethylene-propylene-diene rubber-styrene) resin, mineral oil, synthetic hydrocarbon oil, ester oil, polyglycol oil, silicone oil, and fluorine oil may be mentioned.

Further, in addition to the resin, an additive, for example, a silane coupling agent, coloring agent, thickener, or other known additive can be used. As the thickener, calcium soap, lithium soap, aluminum soap, calcium complex, aluminum complex, lithium complex, barium complex, bentonite, urea, PTFE, sodium terephthalate, silica gel, organic bentonite, and other known ones can be used.

(Action and Effect)

In the above constitution, in the spherical alumina particle mixture of the present invention, the particle size distribution measured by the wet sieving measurement method was 180 μm or more particles in 0.04 wt % or less, the α-alumina crystal content rate measured by XRD was 45% or more, the specific surface area was 0.3 m$^2$/g or more and 1.0 m$^2$/g or less, and the roundness was 0.85 or more. Crushed particles are not used, so it is possible to provide a spherical alumina particle mixture in which the fluidity is improved.

Furthermore, in PTL 3, to improve the α-alumina crystal content rate, crushed particles obtained by firing the fine particle alumina at a high temperature, crushing it, and adjusting the particle size are used, but in the present embodiment, crushed particles are not used. The thermal conductivity is the same as or improved over PTL 3.

EXAMPLES

The present invention will be explained through the following examples and comparative examples. However, the present invention is not to be interpreted limited to the following examples.

Example 1 to Example 12

Each of the alumina particle materials was charged into a high temperature flame formed by LPG and oxygen to make it spherical. The particle size of the alumina particle material charged was controlled to produce spherical alumina particles. Furthermore, the temperature at the inside of the melting furnace was controlled to 1200° C. or more to obtain high α-alumina crystal content rate alumina. The obtained spherical alumina particles were separated by a cyclone separator into coarse particles and fine particles. Both the coarse particles and fine particles were run through a sieve of any mesh and only the particles passed through it were recovered so as to obtain the spherical alumina particles in Table 1. The physical properties of the obtained spherical alumina particles and crushed particles used in the comparative examples were summarized in Table 1. The spherical alumina particles in Table 1 were mixed by the blending ratios in Table 2 to obtain spherical alumina particle mixtures so as to give the desired specific surface areas and α-alumina crystal content rates.

The obtained spherical alumina particle mixtures were measured for (1) viscosity, (2) thermal conductivity, (3) oil absorption, and (4) maximum filler loading in accordance with the following methods.

(1) Viscosity

A spherical alumina particle mixture blended by the ratio of Table 2 in 87 parts by mass and an epoxy resin (Epicoat 801N made by Mitsubishi Chemical) in 13 parts by mass were mixed by a vacuum kneader, the obtained resin composition was made to cool by a water bath for 30 minutes, then a rheometer (MCR-101 made by Anton Paar) was used set with a 25 mm diameter parallel plate, gap of 0.5 mm, and temperature of 25° C. while changing the shear speed to measure the rotational viscosity. In Table 2, two types of viscosity (Pa·s) of shear speeds of 1 [1/s] and 10 [1/s] were described.

(2) Thermal Conductivity

A spherical alumina particle mixture blended by the ratio of Table 2 in 92 parts by mass, a silicon resin A (CY-52-276A made by Toray Dow Corning) in 4 parts by mass, and a silicon resin B (CY-52-276B made by Toray Dow Corning) in 4 parts by mass were mixed by a vacuum kneader. The obtained resin composition was poured into a mold and hot pressed to a thickness of 1.5, 3.5, 5.5, or 7.5 mm. The shaping conditions were a pressure of 6 MPa, a temperature of 120° C., and 1 hour. After heating, the shaped sheet was taken out from the mold and post-heated by a 140° C. dryer. The post-heated sheet was cooled. The prepared sheet was cut into a 20 mm square and measured for thermal conductivity (W/m·K) using ASTM-D5470 under conditions of a pressure of 1.25 kgf/cm$^2$. Note that Example 6 had a maximum filler loading of 91 mass %, so the spherical alumina particle mixture blended in the ratio described in Example 6 in 91 parts by mass, the silicon resin A (CY-52-276A made by Toray Dow Corning) in 4.5 parts by mass, and the silicon resin B (CY-52-276B made by Toray Dow Corning) in 4.5 parts by mass were mixed to obtain the resin composition.

(3) Oil Absorption

A spherical alumina particle mixture blended by the ratio of Table 2 was measured for oil absorption (ml/10 g) in accordance with JIS-K-5101-13-1 using Class 1 Reagent linseed oil (Wako Ikkyu made by Fujifilm Wako Pure Chemical Corporation) instead of refined linseed oil. Linseed oil was dropped on the spherical alumina particle mixture on a glass sheet, a pallet knife was used to knead it in and, while doing, so the amount of linseed oil dropped when reaching the end point (paste state) was calculated as the oil absorption. Spherical alumina particles with a high oil absorption require a large amount of resin for rendering them a liquid composition, so the result can be said to be a particle mixture with poor loading ability.

(4) Maximum Filler Loading

A spherical alumina particle mixture blended by the ratio of Table 2 and the silicon resin A (CY-52-276A made by Toray Dow Corning) were vacuum kneaded by any ratio. Whether filler (spherical alumina particle mixture) not kneaded into the kneaded matter remains was visually confirmed. If no filler remained as a result of visual confirmation, it was deemed that filler was able to be loaded into the filler. The blended amount of filler was continuously increased until filler could no longer be loaded so as to find the maximum filler loading (wt %). The higher the maximum filler loading ability, the more filler that can be loaded in the less resin, so the result can be said to be filler with a good loading ability.

Comparative Examples 1 to 5

The spherical alumina particles and crushed particles in Table 1 were used to obtain alumina particle mixtures in the blends in Table 2. The tests performed were as explained above.

As shown in Table 1 and Table 2, it is learned that the spherical alumina particle mixtures of the present invention are better in viscosity, thermal conductivity, and maximum filler loading than with use of crushed particles. For example, comparing Example 4 and Comparative Example 3, the maximum filler loading is higher in the example. The thermal conductivity at the time of maximum loading is also high. Furthermore, the viscosity is also lower in Example 4, so it can be said that Example 4 is better. In addition, if comparing Example 2 and Comparative Example 2 and Example 3 and Comparative Example 1, the maximum filler loadings are substantially equal, but viscosities are lower in Example 2 than Comparative Example 2 and lower in Example 3 than Comparative Example 1, so in each case, the example can be said to be better. Comparative Example 4 contains crushed particles (2). If compared with Example (7), the maximum filler loadings are substantially equal, but the roundness is lower and the viscosity becomes higher, so Example (7) was better. Further, if comparing Comparative Example 5 and Example 4, Example 4 is higher in thermal conductivity and also lower in viscosity, so the example is better. This is believed to be because, in Comparative Example 4, ultrafine particles (2) are included and the specific surface area ended up becoming greater.

TABLE 1

| | Average particle size (µm) | Specific surface area (m²/g) | Roundness (—) |
|---|---|---|---|
| Large particles (1) | 148.2 | 0.08 | 0.98 |
| Large particles (2) | 111 | 0.15 | 0.96 |
| Large particles (3) | 108.3 | 0.18 | 0.942 |
| Large particles (4) | 76 | 0.21 | 0.961 |
| Large particles (5) | 44.2 | 0.3 | 0.94 |
| Large particles (6) | 32 | 0.31 | 0.972 |
| Medium particles (1) | 19 | 0.3 | 0.943 |
| Medium particles (2) | 11 | 0.42 | 0.952 |
| Medium particles (3) | 5.5 | 0.64 | 0.956 |
| Fine particles (1) | 3.5 | 0.94 | 0.963 |
| Fine particles (2) | 2.4 | 1.11 | 0.914 |
| Ultrafine particles (1) | 0.9 | 3.5 | 0.91 |
| Ultrafine particles (2) | 0.2 | 8 | 0.97 |
| Crushed particles (1) | 0.9 | 7.34 | 0.598 |
| Crushed particles (2) | 2.9 | 1.61 | 0.82 |

TABLE 2

| | Ex. (1) | Ex. (2) | Ex. (3) | Ex. (4) | Ex. (5) | Comp. Ex. (1) | Comp. Ex. (2) | Comp. Ex. (3) | Ex. (6) |
|---|---|---|---|---|---|---|---|---|---|
| Large particles (1) | | | | | | | | | |
| Large particles (2) | | | | | | | | | |
| Large particles (3) | 60% | | | | | | | | |
| Large particles (4) | | 60% | 60% | 60% | 60% | 60% | 60% | 60% | |
| Large particles (5) | | | | | | | | | |
| Large particles (6) | | | | | | | | | 70% |
| Medium particles (1) | | | | | | | | | |
| Medium particles (2) | 15% | 15% | 20% | 20% | 10% | 20% | 15% | 20% | |
| Medium particles (3) | | | | | | | | | 25% |
| Fine particles (1) | | | | | | | | | |
| Fine particles (2) | 15% | 15% | 10% | | 10% | 10% | 15% | | 5% |
| Ultrafine particles (1) | 10% | 10% | 10% | 20% | 20% | | | | |
| Ultrafine particles (2) | | | | | | | | | |
| Crushed particles (1) | | | | | | 10% | 10% | 20% | |
| Crushed particles (2) | | | | | | | | | |
| Average particle size (µm) | 52.4 | 17.2 | 39.0 | 31.9 | 14.2 | 37.1 | 37.6 | 35.0 | 19.3 |
| Specific surface area (m²/g) | 0.62 | 0.72 | 0.67 | 0.87 | 0.93 | 1.04 | 1.14 | 1.68 | 0.4 |
| Roundness (—) | 0.92 | 0.91 | 0.91 | 0.92 | 0.92 | 0.84 | 0.83 | 0.82 | 0.95 |
| Wet sieving 180 µm+ (wt %) | — | — | — | — | — | — | — | — | — |
| Wet sieving 150 µm+ (wt %) | 0.0 | 0.0 | 0.0 | 0.0 | 0.0 | 0.0 | 0.0 | 0.0 | 0.0 |
| Wet sieving 75 µm+ (wt %) | — | — | — | — | — | — | — | — | 0.0 |
| Wet sieving 53 µm+ (wt %) | — | — | — | — | — | — | — | — | 0.0 |
| α-alumina crystal content rate (%) | 47.53 | 47.06 | 48.67 | 48.42 | 46.05 | 65.32 | 58.34 | 78.18 | 60 |
| Maximum loading filler rate (wt %) | 95 | 95 | 95 | 95 | 95 | 94 | 95 | 93 | 91 |
| Thermal conductivity at time of maximum loading (W/m · K) | 7.60 | 6.28 | 7.02 | 7.51 | 7.57 | 6.20 | 6.94 | 5.20 | 3.48 |
| Thermal conductivity (filler rate 92 wt %) | 5.02 | 4.84 | 4.91 | 5.03 | 4.50 | 4.58 | 4.81 | 4.95 | — |
| Oil absorption (ml/10 g) | 0.45 | 0.475 | 0.45 | 0.45 | 0.55 | 0.6 | 0.6 | 0.7 | 0.78 |
| Viscosity (shear speed 1/s) (Pa · s) | 99.7 | 93.0 | 93.5 | 94.7 | 99.0 | 127.1 | 134.3 | 171.2 | 501.8 |
| Viscosity (shear speed 10/s) (Pa · s) | 80.4 | 77.1 | 79.1 | 75.7 | 75.3 | 97.3 | 100.3 | 125.2 | 265.8 |

| | Ex. (7) | Comp. Ex. (4) | Ex. (8) | Ex. (9) | Ex. (10) | Ex. (11) | Ex. (12) | Comp. Ex. (5) |
|---|---|---|---|---|---|---|---|---|
| Large particles (1) | | | 60% | | | | | |
| Large particles (2) | | | | 60% | | | | |
| Large particles (3) | | | | | | | | |
| Large particles (4) | | | | | | 60% | | 60% |
| Large particles (5) | 70% | 70% | | | | | | |
| Large particles (6) | | | | | 60% | | 70% | |
| Medium particles (1) | | | | | | 20% | | |
| Medium particles (2) | | | 20% | 20% | 15% | | | 20% |
| Medium particles (3) | 25% | 25% | | | | | 25% | |
| Fine particles (1) | | | | | | | 5% | |
| Fine particles (2) | 5% | | | | 15% | | | |
| Ultrafine particles (1) | | | 20% | 20% | 5% | 20% | | |
| Ultrafine particles (2) | | | | | | | | 20% |
| Crushed particles (1) | | | | | | | | |
| Crushed particles (2) | | 5% | | | | | | |

TABLE 2-continued

| Average particle size (μm) | 34.8 | 31.5 | 112.4 | 53.6 | 18.6 | 42.0 | 25.0 | 43.9 |
|---|---|---|---|---|---|---|---|---|
| Specific surface area (m²/g) | 0.38 | 0.451 | 0.74 | 0.81 | 0.86 | 0.87 | 0.36 | 1.75 |
| Roundness (—) | 0.92 | 0.84 | 0.95 | 0.93 | 0.88 | 0.92 | 0.94 | 0.95 |
| Wet sieving 180 μm+ (wt %) | — | — | 0.0 | — | — | — | — | — |
| Wet sieving 150 μm+ (wt %) | 0.0 | 0.0 | — | 0.0 | 0.0 | 0.0 | 0.0 | 0.0 |
| Wet sieving 75 μm+ (wt %) | 0.0 | 0.0 | — | — | 0.0 | — | 0.0 | — |
| Wet sieving 53 μm+ (wt %) | — | — | — | — | — | — | — | — |
| α-alumina crystal content rate (%) | 60 | 70.21 | 60.21 | 55.48 | 55.88 | 53.77 | 70.75 | 46.69 |
| Maximum loading filler rate (wt %) | 93.5 | 93 | 96 | 95 | 95 | 94 | 91 | 94 |
| Thermal conductivity at time of maximum loading (W/m · K) | 4.72 | 4.30 | 7.88 | 7.30 | 6.43 | 5.80 | 3.26 | 5.90 |
| Thermal conductivity (filler rate 92 wt %) | 3.48 | 3.30 | 4.60 | 4.71 | 3.56 | 4.09 | — | 4.42 |
| Oil absorption (ml/10 g) | 0.73 | 0.87 | 0.34 | 0.38 | 0.45 | 0.38 | 0.73 | 0.53 |
| Viscosity (shear speed 1/s) (Pa · s) | 323.7 | 617.0 | 63.6 | 66.0 | 159.8 | 94.5 | 409.7 | 148.5 |
| Viscosity (shear speed 10/s) (Pa · s) | 187.0 | 306.0 | 52.2 | 61.5 | 115.5 | 76.9 | 191.1 | 103.6 |

(Effect of Blending Particles)

The spherical alumina particle mixture according to the present invention can be obtained by blending spherical alumina particles having different average particle sizes. The spherical alumina particles blended, as shown in Table 3, are classified by average particle size into large particles, medium particles, fine particles, and ultrafine particles (respectively sometimes also referred to as "coarse powder", "medium powder", "fine powder", and "ultrafine powder"). One type of particles selected from the classified spherical alumina particles was greatly changed in blending ratio and investigated for the change of properties of the spherical alumina particle mixture.

Note that, due to the change of the blending rate of the selected one type of particles, the blending ratios of the not selected particles also change, but as much as possible, adjustments are made so that the changes do not become that great. Typically, as shown in Table 4-1, when making the blending ratio of the large particles increase in 10 mass % increments, the blending ratios of the medium particles and fine particles (other than the large particles) are lowered while maintaining the ratios of these as much as possible etc. and trying to keep the blending ratios from changing the larger the particles.

TABLE 3

| | Average particle size (μm) | Specific surface area (m²/g) | Roundness (—) |
|---|---|---|---|
| Large particles 1' | 111.8 | 0.15 | 0.94 |
| Medium particles 1' | 11 | 0.42 | 0.952 |
| Medium particles 2' | 5.5 | 0.64 | 0.956 |
| Fine particles 1' | 2.4 | 1.11 | 0.914 |
| Ultrafine particles 1' | 0.9 | 3.5 | 0.91 |

Figure 3:
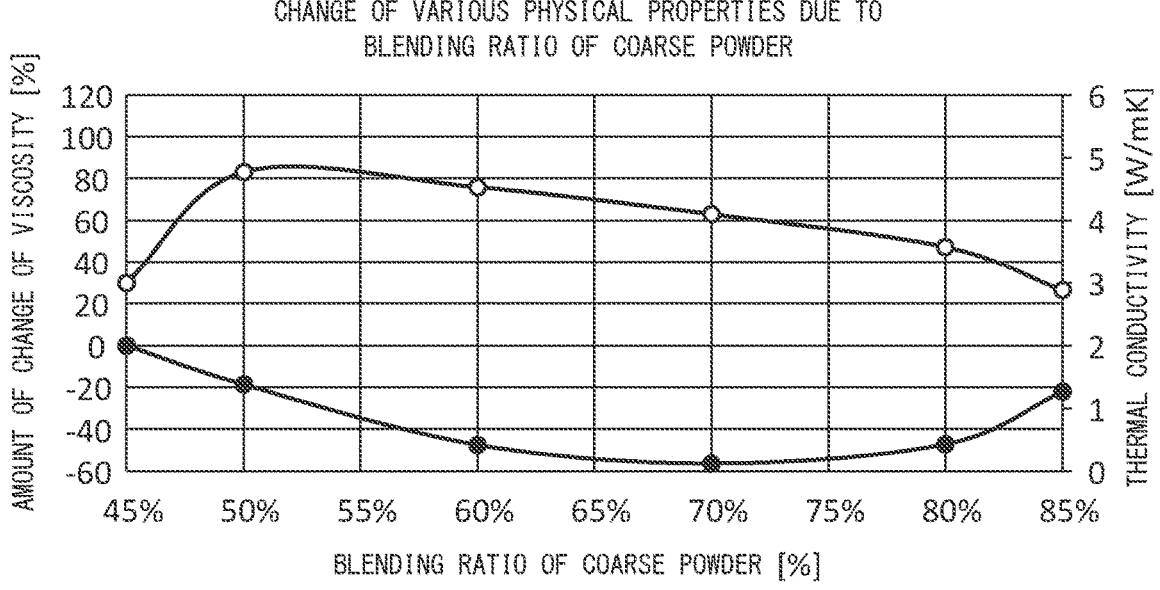
FIG. 3 is a chart showing changes of thermal conductivity and viscosity when mainly making the blending ratio of large particles in an alumina particle mixture change.

Table 4-1 shows the properties of spherical alumina particle mixtures when mainly making the blending ratios of large particles change in spherical alumina particle mixtures containing large particles, medium particles, and fine particles. In particular, the changes in viscosity and thermal conductivity are shown in FIG. 3. As shown in FIG. 3, it was confirmed that with a blending rate of the large particles of 50 to 80 mass % in range, better thermal conductivity and viscosity are obtained compared with other ranges.

TABLE 4-1

| Large particles 1' | 45% | 50% | 60% | 70% | 80% | 85% |
|---|---|---|---|---|---|---|
| Medium particles 2' | 38.5% | 35% | 28% | 21% | 14% | 10% |
| Fine particles 1' | 16.5% | 15% | 12% | 9% | 6% | 5% |
| Average particle size (μm) | 6.5 | 6.2 | 10.2 | 68.4 | 92 | 89.2 |
| Specific surface area (m²/g) | 0.55 | 0.5 | 0.41 | 0.33 | 0.26 | 0.22 |
| Wet sieving 150 μm+ (wt %) | 0.0 | 0.0 | 0.0 | 0.0 | 0.0 | 0.0 |
| α-alumina crystal content rate (%) | 45.35 | 48.50 | 54.80 | 61.10 | 67.40 | 70.50 |
| Viscosity (1/s) (Pa · s) | 225.25 | 183.25 | 118.27 | 98.368 | 118.91 | 175.39 |
| Viscosity (10/s) (Pa · s) | 150.41 | 133.71 | 93.647 | 74.911 | 72.953 | 89.933 |
| Thermal conductivity (92 wt %) (W/m · K) | 3 | 4.774 | 4.532 | 4.1 | 3.576 | 2.88 |

Figure 4:
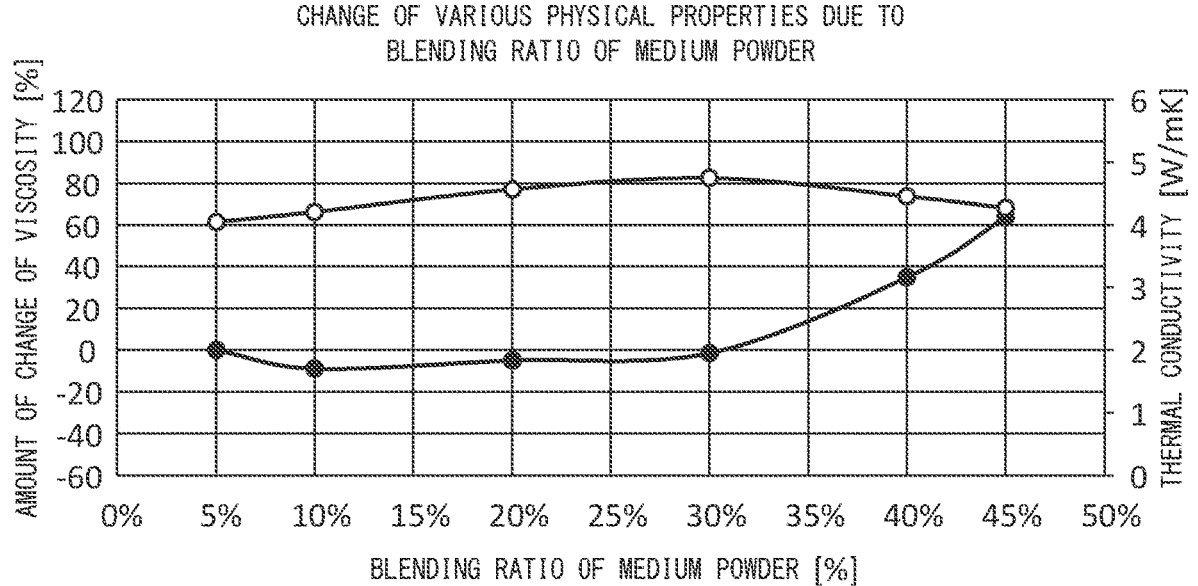
FIG. 4 is a chart showing changes of thermal conductivity and viscosity when mainly making the ratio of mixture of medium particles in an alumina particle mixture change.

Table 4-2 shows the properties of the spherical alumina particle mixtures when changing mainly the blending ratio of the medium particles in spherical alumina particle mixtures containing large particles, medium particles, and fine particles. In particular, the changes in the viscosity and thermal conductivity are shown in FIG. 4. As shown in FIG. 4, it was confirmed that with a blending rate of the medium particles of 10 to 40 mass % in range, better thermal conductivity and viscosity are obtained compared with other ranges.

TABLE 4-2

| Large particles 1' | 76% | 72% | 64% | 63% | 54% | 50% |
|---|---|---|---|---|---|---|
| Medium particles 2' | 5% | 10% | 20% | 30% | 40% | 45% |
| Fine particles 1' | 19% | 18% | 16% | 7% | 6% | 5% |

TABLE 4-2-continued

| | | | | | | |
|---|---|---|---|---|---|---|
| Average particle size (μm) | 57.7 | 5.7 | 17.8 | 20.2 | 13 | 10.2 |
| Specific surface area (m²/g) | 0.38 | 0.4 | 0.42 | 0.33 | 0.37 | 0.39 |
| Wet sieving 150 μm+ (wt %) | 0.0 | 0.0 | 0.0 | 0.0 | 0.0 | 0.0 |
| α-alumina crystal content rate (%) | 63.70 | 61.40 | 56.80 | 57.10 | 51.80 | 49.50 |
| Viscosity (1/s) (Pa · s) | 92.076 | 83.847 | 87.442 | 90.677 | 123.97 | 150.67 |
| Viscosity (10/s) (Pa · s) | 68.767 | 67.575 | 74.291 | 75.84 | 98.774 | 112.63 |
| Thermal conductivity (92 wt %) (W/m · K) | 4.05 | 4.21 | 4.57 | 4.75 | 4.46 | 4.271 |

Figure 5:
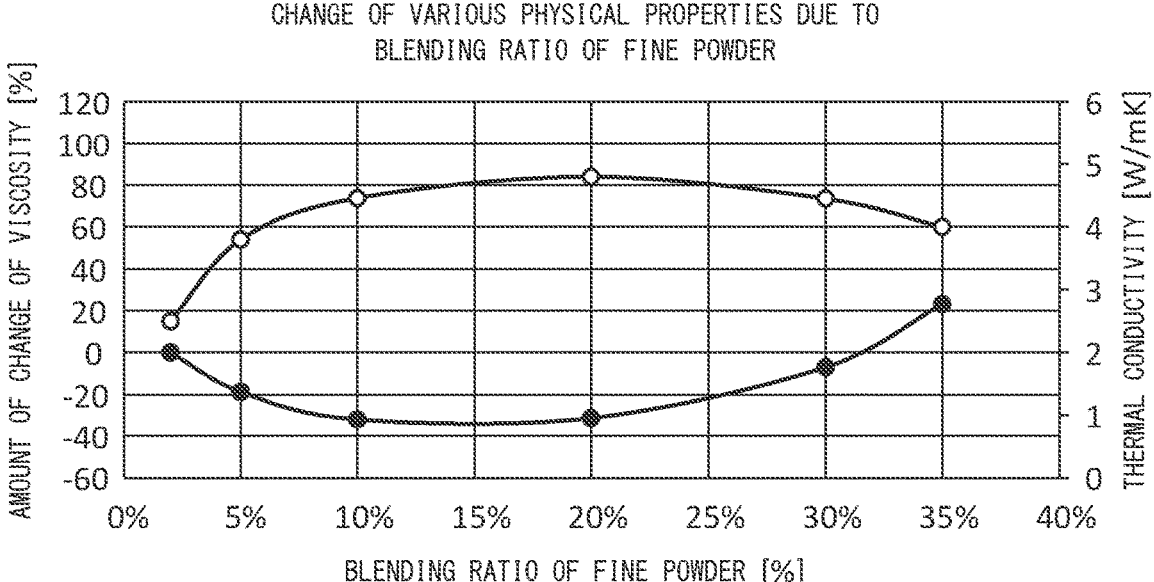
FIG. 5 is a chart showing changes of thermal conductivity and viscosity when mainly making the ratio of mixture of fine particles in an alumina particle mixture change.

Table 4-3 shows the properties of the spherical alumina particle mixtures when changing mainly the blending ratio of the fine particles in spherical alumina particle mixtures containing large particles, medium particles, and fine particles. In particular, the changes in the viscosity and thermal conductivity are shown in FIG. 5. As shown in FIG. 5, it was confirmed that with a blending rate of the fine particles of 5 to 30 mass % in range, better thermal conductivity and viscosity are obtained compared with other ranges.

TABLE 4-3

| | | | | | | |
|---|---|---|---|---|---|---|
| Large particles 1' | 78.4% | 76% | 72% | 64% | 56% | 52% |
| Medium particles 2' | 19.6% | 19% | 18% | 16% | 14% | 13% |
| Fine particles 1' | 2% | 5% | 10% | 20% | 30% | 35% |
| Average particle size (μm) | 85.9 | 71.8 | 61.2 | 15.2 | 4 | 4 |
| Specific surface area (m²/g) | 0.23 | 0.25 | 0.33 | 0.45 | 0.59 | 0.65 |
| Wet sieving 150 μm+ (wt %) | 0.0 | 0.0 | 0.0 | 0.0 | 0.0 | 0.0 |
| α-alumina crystal content rate (%) | 66.84 | 65.10 | 62.20 | 56.40 | 50.60 | 47.70 |
| Viscosity (1/s) (Pa · s) | 115.83 | 94.017 | 78.726 | 79.537 | 107.72 | 142.57 |
| Viscosity (10/s) (Pa · s) | 72.087 | 65.044 | 62.158 | 68.315 | 89.652 | 110.79 |
| Thermal conductivity (92 wt %) (W/m · K) | 2.5 | 3.8 | 4.46 | 4.8 | 4.45 | 4 |

Figure 6:
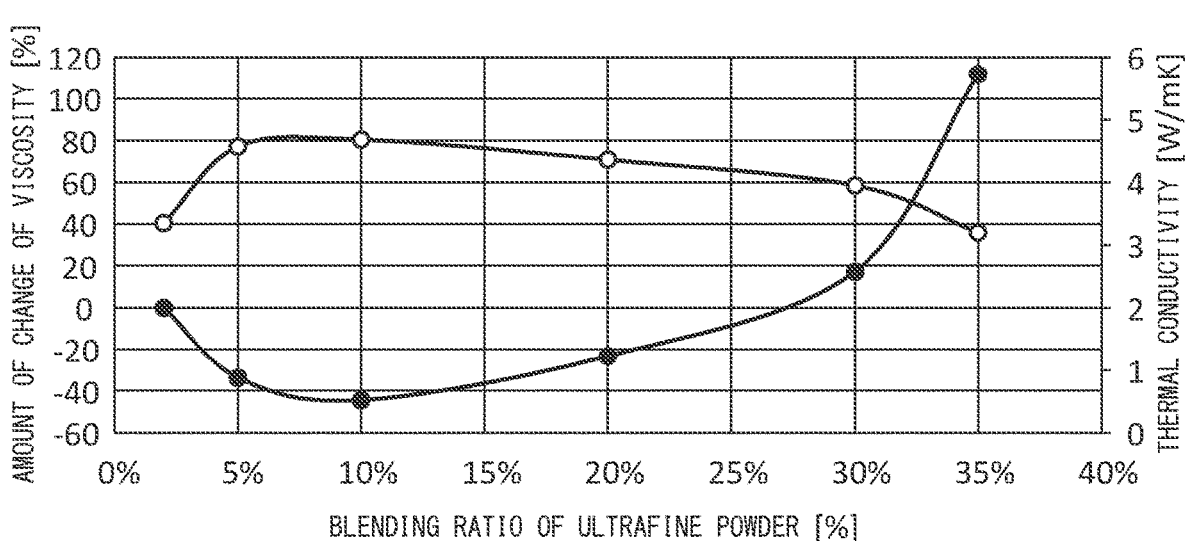
FIG. 6 is a chart showing changes of thermal conductivity and viscosity when mainly making the ratio of mixture of ultrafine particles in an alumina particle mixture change.

Table 4-4 shows the properties of the spherical alumina particle mixtures when changing mainly the blending ratio of the ultrafine particles in spherical alumina particle mixtures containing large particles, medium particles, and ultrafine particles. In particular, the changes in the viscosity and thermal conductivity are shown in FIG. 6. As shown in FIG. 6, it was confirmed that with a blending rate of the ultrafine particles of 5 to 30 mass % in range, better thermal conductivity and viscosity are obtained compared with other ranges.

TABLE 4-4

| | | | | | | |
|---|---|---|---|---|---|---|
| Large particles 1' | 78.4% | 76% | 72% | 64% | 56% | 52% |
| Medium particles 2' | 19.6% | 19% | 18% | 16% | 14% | 13% |
| Ultrafine particles 1' | 2% | 5% | 10% | 20% | 30% | 35% |
| Average particle size (μm) | 83 | 74.5 | 76.9 | 9 | 5.8 | 2.9 |
| Specific surface area (m²/g) | 0.26 | 0.33 | 0.48 | 0.71 | 0.95 | 1.12 |
| Wet sieving 150 μm+ (wt %) | 0.0 | 0.0 | 0.0 | 0.0 | 0.0 | 0.0 |
| α-alumina crystal content rate (%) | 66.66 | 64.65 | 61.30 | 54.60 | 47.90 | 44.55 |
| Viscosity (1/s) (Pa · s) | 118.08 | 78.374 | 65.69 | 90.681 | 138.57 | 250.1 |
| Viscosity (10/s) (Pa · s) | 75.577 | 58.882 | 53.417 | 74.291 | 105.6 | 161.34 |
| Thermal conductivity (92 wt %) (W/m · K) | 3.35 | 4.57 | 4.68 | 4.36 | 3.95 | 3.2 |

Table 4-5 shows the properties of the spherical alumina particle mixtures when changing mainly the blending ratio of the large particles in spherical alumina particle mixtures containing large particles, medium particles, fine particles, and ultrafine particles. It was confirmed that with a blending rate of the large particles of 50 to 70 mass % in range, better thermal conductivity and viscosity are obtained compared with other ranges.

TABLE 8

Table 4-5

| | | | | | |
|---|---|---|---|---|---|
| Large particles 1' | 40% | 50% | 60% | 70% | 85% |
| Medium particles 1' | 20% | 17% | 13% | 10% | 5% |
| Fine particles 1' | 20% | 17% | 13% | 10% | 5% |
| Ultrafine particles | 20% | 18% | 14% | 10% | 5% |
| Average particle size (μm) | 4.1 | 6.9 | 77.1 | 89.6 | 103.8 |

TABLE 8-continued

Table 4-5

| | | | | | |
|---|---|---|---|---|---|
| Specific surface area (m²/g) | 1.14 | 0.95 | 0.76 | 0.69 | 0.4 |
| Wet sieving 150 μm+ (wt %) | 0.0 | 0.0 | 0.0 | 0.0 | 0.0 |
| α-alumina crystal content rate (%) | 40.80 | 47.49 | 53.73 | 60.40 | 63.57 |
| Viscosity (1/s) (Pa · s) | 188.06 | 110.26 | 74.206 | 64.928 | 146.82 |
| Viscosity (10/s) (Pa · s) | 126.74 | 86.185 | 61.948 | 53.609 | 87.236 |
| Thermal conductivity (92 wt %) (W/m · K) | 3.62 | 4.04 | 4.33 | 4.5 | 3.04 |

Note that, the spherical alumina particle mixtures blended in Table 4-1 to Table 4-5 are blends of large particles, medium particles, fine particles, and ultrafine particles with roundnesses of 0.85 or more shown in Table 3. It was confirmed that the roundnesses of the spherical alumina particle mixtures were also 0.85 or more.

The invention claimed is:

1. A spherical alumina particle mixture wherein in a particle size distribution measured by a wet sieving test method, 180 μm or more particles account for 0.04 wt % or less, an average particle size is 14.2 μm to 112.4 μm, an α-alumina crystal content rate is 45% or more and 55.88% or less, a specific surface area is 0.5 to 1.0 m²/g, and a roundness is 0.85 or more.

2. The spherical alumina particle mixture according to claim 1, containing at least three types or more of particles selected from the group comprising spherical alumina particles (a) with an average particle size (D50) of 30 to 160 μm and with a roundness of 0.90 or more, spherical alumina particles (b) with a D50 of 4 to 12 μm and with a roundness of 0.90 or more, spherical alumina particles (c) with a D50 of 2 to 3 μm and with a roundness of 0.90 or more, and spherical alumina particles (d) with a D50 of 0.8 to 1.0 μm and with a roundness of 0.90 or more, containing the spherical alumina particles (a) in 50 to 80 wt %, the spherical alumina particles (b) in 10 to 30 wt %, and the spherical alumina particles (d) in 5 to 30 wt % and having a total of the spherical alumina particles (a), spherical alumina particles (b), and spherical alumina particles (d) of 90 wt % or more.

3. The spherical alumina particle mixture according to claim 1, containing at least three types or more of particles selected from the group comprising spherical alumina particles (a) with an average particle size (D50) of 30 to 160 μm and with a roundness of 0.90 or more, spherical alumina particles (b) with a D50 of 4 to 12 μm and with a roundness of 0.90 or more, spherical alumina particles (c) with a D50 of 2 to 3 μm and with a roundness of 0.90 or more, and spherical alumina particles (d) with a D50 of 0.8 to 1.0 μm and with a roundness of 0.90 or more, and containing the spherical alumina particles (a) in 50 to 80 wt %, the spherical alumina particles (b) in 10 to 40 wt %, and the spherical alumina particles (c) in 5 to 30 wt % and having a total of the spherical alumina particles (a), spherical alumina particles (b), and spherical alumina particles (c) of 90 wt % or more.

4. The spherical alumina particle mixture according to claim 1, containing at least four types or more of particles selected from the group comprising spherical alumina particles (a) with an average particle size (D50) of 30 to 160 μm and with a roundness of 0.90 or more, spherical alumina particles (b) with a D50 of 4 to 12 μm and with a roundness of 0.90 or more, spherical alumina particles (c) with a D50 of 2 to 3 μm and with a roundness of 0.90 or more, and spherical alumina particles (d) with a D50 of 0.8 to 1.0 μm and with a roundness of 0.90 or more, and containing the spherical alumina particles (a) in 50 to 70 wt %, the spherical alumina particles (b) in 10 to 30 wt %, the spherical alumina particles (c) in 10 to 30 wt %, and the spherical alumina particles (d) in 5 to 30 wt % and having a total of the spherical alumina particles (a), spherical alumina particles (b), spherical alumina particles (c), and spherical alumina particles (d) of 90 wt % or more.

5. The spherical alumina particle mixture according to claim 1, wherein the specific surface area is 0.62 to 0.93 m²/g.

6. A method for producing spherical alumina particle mixture according to claim 1, which method for producing a spherical alumina particle mixture comprising mixing at least three types or more of particles selected from the group comprising spherical alumina particles (a) with an average particle size (D50) of 30 to 160 μm and with a roundness of 0.90 or more, spherical alumina particles (b) with a D50 of 4 to 12 μm and with a roundness of 0.90 or more, spherical alumina particles (c) with a D50 of 2 to 3 μm and with a roundness of 0.90 or more, and spherical alumina particles (d) with a D50 of 0.8 to 1.0 μm and with a roundness of 0.90 or more.

* * * * *